(12) United States Patent
Kiribuchi

(10) Patent No.: US 12,118,277 B2
(45) Date of Patent: Oct. 15, 2024

(54) ASSISTANCE DEVICE AND DESIGN ASSISTANCE PROGRAM

(71) Applicant: OMRON Corporation, Kyoto (JP)

(72) Inventor: Takeshi Kiribuchi, Osaka (JP)

(73) Assignee: OMRON Corporation, Kyoto (JP)

( * ) Notice: Subject to any disclaimer, the term of this patent is extended or adjusted under 35 U.S.C. 154(b) by 723 days.

(21) Appl. No.: 17/297,849

(22) PCT Filed: Dec. 10, 2019

(86) PCT No.: PCT/JP2019/048285
§ 371 (c)(1),
(2) Date: May 27, 2021

(87) PCT Pub. No.: WO2020/122066
PCT Pub. Date: Jun. 18, 2020

(65) Prior Publication Data
US 2022/0019711 A1  Jan. 20, 2022

(30) Foreign Application Priority Data
Dec. 14, 2018 (JP) .................................. 2018-234276

(51) Int. Cl.
*G06F 30/20* (2020.01)
*G06F 30/18* (2020.01)
(Continued)

(52) U.S. Cl.
CPC .............. *G06F 30/20* (2020.01); *G06F 30/18* (2020.01); *G06F 2113/16* (2020.01); *H02P 5/74* (2013.01); *H02P 27/06* (2013.01)

(58) Field of Classification Search
CPC ...... G06F 30/20; G06F 30/18; G06F 2113/16; H02P 5/74; H02P 27/06
(Continued)

(56) References Cited

U.S. PATENT DOCUMENTS

| 6,526,516 B1 | 2/2003 | Ishikawa et al. |
| 2003/0085674 A1 | 5/2003 | Numaguchi |

(Continued)

FOREIGN PATENT DOCUMENTS

| CN | 1094545 A | 11/1994 |
| CN | 1224873 A | 8/1999 |

(Continued)

OTHER PUBLICATIONS

Office Action issued in Chinese Appln. No. 201980079290.4 mailed Oct. 11, 2023. English translation provided.
(Continued)

*Primary Examiner* — Brian S Cook
(74) *Attorney, Agent, or Firm* — ROSSI, KIMMS & McDOWELL LLP

(57) ABSTRACT

A design support device including: a unit configured to acquire configuration information indicating a configuration of the power distribution supply path; a unit configured to acquire, for each of the plurality of load devices, operation pattern information representing an operation pattern of the load device; a unit configured to calculate, for each power cable, a maximum current value, which is a maximum value of a current flowing through the power cable, based on the configuration information and the operation pattern information of each load device; and a unit configured to output, for each power cable, at least one of the maximum current value for the power cable and recommended cable information representing a cable recommended for use as the power cable based on the calculated maximum current value for each power cable. With this configuration, the design of the power supply system is supported.

6 Claims, 11 Drawing Sheets

(51) Int. Cl.
*G06F 113/16* (2020.01)
*H02P 5/74* (2006.01)
*H02P 27/06* (2006.01)

(58) Field of Classification Search
USPC .......................................................... 703/18
See application file for complete search history.

(56) References Cited

U.S. PATENT DOCUMENTS

| | | | |
|---|---|---|---|
| 2012/0091814 A1 | 4/2012 | Koshin et al. | |
| 2015/0005972 A1 | 1/2015 | Ishida et al. | |
| 2017/0057360 A1* | 3/2017 | Murthy | B60L 15/2009 |
| 2018/0340840 A1* | 11/2018 | Bullock | G01K 13/00 |

FOREIGN PATENT DOCUMENTS

| | | | |
|---|---|---|---|
| CN | 101908080 A | | 12/2010 |
| CN | 101989365 A | | 3/2011 |
| CN | 102804545 A | | 11/2012 |
| JP | H1051955 A | | 2/1998 |
| JP | 2003153587 A | | 5/2003 |
| JP | 2004164162 A | | 6/2004 |
| JP | 2013080441 A | | 5/2013 |
| KR | 19980041010 | * | 8/1998 |
| WO | 2013051665 A1 | | 4/2013 |

OTHER PUBLICATIONS

Wang. "Influence of Distribution Network Three-phase Unbalance on Line Loss Increase Rate and Voltage Offset." Electric Power Engineering Technology. 2017: 131-136. vol. 36, No. 4. English abstract provided.
International Search Report issued in Intl. Appln. No. PCT/JP2019/048285 mailed Jan. 28, 2020. English translation provided.
Written Opinion issued in Intl. Appln. No. PCT/JP2019/048285 mailed Jan. 28, 2020. English translation provided.

* cited by examiner

ASSISTANCE DEVICE AND DESIGN ASSISTANCE PROGRAM

TECHNICAL FIELD

The present invention relates to a design support device and a design support program.

BACKGROUND ART

The following systems are known as systems in which power is supplied from one power supply to a plurality of load devices.

- A system in which a plurality of load devices are connected in a daisy chain by a power cable, and one load device in the plurality of load devices and a power supply are connected by a power cable (see Patent Document 1; hereinafter referred to as a daisy chain connection system).
- A system in which a power supply and a plurality of load devices are connected by a power supply line in which a plurality of power cables are combined so as to branch off from the power supply side (hereinafter referred to as a tree connection system).

In any system of the configuration, it is desired that the electrical performance and the mechanical performance of each power cable do not deteriorate due to the operation of the system. Therefore, when the daisy chain connection system or the tree connection system is designed and constructed, for each current path in which the power cable should be placed, the maximum current flowing through the current path is obtained based on the maximum current consumption of each load device, and a power cable with a permissible current greater than or equal to the obtained maximum current is used for each current path.

PRIOR ART DOCUMENTS

Patent Documents

Patent Document 1: Japanese Unexamined Patent Publication No. 2003-153587

SUMMARY OF THE INVENTION

Problems To Be Solved by the Invention

If a power cable that satisfies the above conditions is used, it is possible to suppress a deterioration in the performance of each power cable due to the operation of the system (energization of each power cable). However, the current consumptions of a plurality of load devices in the system are not always maximized at the same time. Therefore, when the specifications of each power cable of a system such as a daisy chain connection system or a tree connection system (that is, a system in which power from a power supply is distributed and supplied to a plurality of load devices by a power distribution supply path in which a plurality of power cables are combined) are determined as described above, there is a risk that the power cable on the upstream side will have excessively high specifications and the manufacturing cost of the system will increase.

The present invention has been made in view of the above problem, and has an object to provide a power supply system in which power from a power supply is distributed and supplied to a plurality of load devices by a power distribution supply path in which a plurality of power cables are combined, and a technology that enables design of a power supply system in which a power cable having appropriate specifications is used as each power cable.

Means for Solving the Problem

According to one aspect of the present invention, there is provided a design support device configured to support design of a power supply system in which power from a power supply is distributed and supplied to a plurality of load devices by a power distribution supply path in which a plurality of power cables are combined, the design support device including: a first acquisition unit configured to acquire configuration information indicating a configuration of the power distribution supply path; a second acquisition unit configured to acquire, for each of the plurality of load devices, operation pattern information representing an operation pattern of the load device; a calculation unit configured to calculate, for each power cable in the power supply system, a maximum current value, which is a maximum value of a current flowing through the power cable, based on the configuration information acquired by the first acquisition unit and the operation pattern information for the plurality of load devices acquired by the second acquisition unit; and an output unit configured to output, for each power cable in the power supply system, at least one of the maximum current value for the power cable and recommended cable information representing a cable recommended for use as the power cable based on the maximum current value for each power cable calculated by the calculation unit.

That is, the design support device is configured to obtain the maximum value of the current actually flowing through each power cable of the power distribution supply path whose configuration is indicated by the configuration information based on the operation pattern information of each load device, and output the obtained maximum value, etc. Therefore, a user of the design support device can configure the power distribution supply path from the power cables having appropriate specifications based on the information (maximum current value and/or recommended cable information) for each output power cable.

The configuration information and the operation pattern information acquired by the first and second acquisition units of the design support device may be information regarding a power supply system for one power supply in a power supply system in which power is distributed and supplied from each of a plurality of power supplies to a plurality of load devices. Further, the operation pattern information acquired by the second acquisition unit may be information that can be directly converted into a time change pattern of the current flowing in the load device or information that can be converted into a time change pattern of the current flowing in the load device in combination with other information (specification information of each load device, etc.). Further, the load device of the power supply system whose design is supported by the design support device (hereinafter also referred to as a design target system) may be a device that operates with either DC power or AC power. Further, the design target system may be a system in which a regenerative current is generated or a system in which a regenerative current is not generated. When the design target system generates a regenerative current, if the maximum value of the regenerative current flowing through a power cable α (α is an identifier of the power cable) is larger than the maximum value of a power running current flowing through the power cable α, as the calculation unit of the design support device, a unit configured to calculate the maximum value of the regenerative current as the maximum value of the power cable is adopted.

There may be adopted, to the design support device, a configuration in which "the power supply system is a system which includes a DC power supply as the power supply, and includes a load machine, an electric motor configured to drive the load machine, and an inverter configured to control the electric motor as the plurality of load devices, the second acquisition unit is configured to acquire a command value group input in time series to the inverter as each load device as the pattern information for each load device during an actual operation of each load device, and the calculation unit is configured to generate time series data of a current flowing into each load device based on the pattern information for each load device, and calculate the maximum current value for each power cable based on the generated time series data for each load device and the configuration information."

When the design target system is the above system, the maximum value of the regenerative current flowing through each power cable is usually less than the maximum value of the power running current flowing through each power cable. Therefore, in addition to the above configuration, there may be adopted, to the design support device, a configuration in which "the calculation unit is further configured to calculate a maximum value of a regenerative current flowing through the power cable directly connected to the power supply in a direction of the power supply based on the time series data for each load device, and the output unit is configured to output also the maximum value of the regenerative current calculated by the calculation unit" (that is, a configuration in which the calculation unit is configured to output the maximum value of the regenerative current and the maximum value of the power running current for the power cable directly connected to the power supply). According to the design support device that adopts these configurations, the specifications of a smoothing capacitor and a regenerative resistor provided in the power cable, etc. directly connected to the power supply can be appropriately determined based on the maximum value of the output regenerative current.

There may be adopted, to the design support device, a configuration in which "the first acquisition unit is configured to be able to acquire a plurality of pieces of the configuration information, and, when the plurality of pieces of the configuration information are acquired by the first acquisition unit, the calculation unit is configured to calculate the maximum current value for each power cable in the power supply system having a configuration defined by the configuration information for each acquired configuration information". Further, there may be adopted, to the design support device, a configuration in which the power distribution supply path includes one or a plurality of cable connection connectors configured to connect at least three power cables in the plurality of power cables, and the design support device further includes a second output unit configured to output connector designation information for designating a connector recommended for use as each cable connection connector based on the maximum current value for each power cable calculated by the calculation unit.

Further, the design support program according to one aspect of the present invention can operate a computer as the design support device according to any one of claims 1 to 5. Therefore, according to the design support program, it is possible to design the power supply system in which a power cable having appropriate specifications is used as each power cable.

Effect of the Invention

According to the present invention, it is possible to provide the power supply system in which power from the power supply is distributed and supplied to the plurality of load devices by the power distribution supply path in which the plurality of power cables are combined, and design the power supply system in which the power cable having appropriate specifications is used is used as each power cable.

MODE FOR CARRYING OUT THE INVENTION

Hereinafter, an embodiment of the present invention will be described with reference to the drawings.

Figure 1:
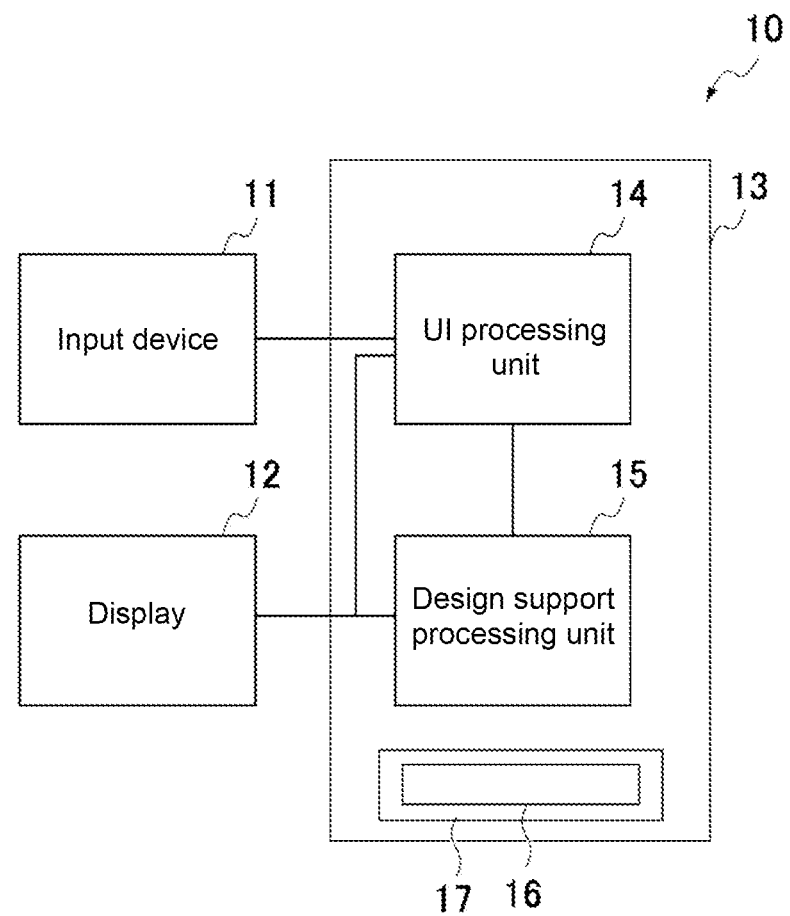
FIG. 1 is a block diagram of a design support device according to an embodiment of the present invention.

FIG. 1 illustrates a block diagram of a design support device 10 according to the embodiment of the present invention.

As illustrated in the figure, the design support device 10 according to the embodiment includes an input device 11 such as a keyboard and a mouse, a display 12, and a main body 13.

The main body 13 is a unit composed of a CPU (Central Processing Unit), a RAM (Random Access Memory), a non-volatile storage device (hard disk drive, solid state drive, etc.) 17, and the like. A design support program 16 is installed in the non-volatile storage device 17 of the main body 13, and the CPU reads the design support program 16 on the RAM and executes it, so that the main body 13 operates as a UI processing unit 14 and a design support processing unit 15.

Before the functions of the UI processing unit 14 and the design support processing unit 15 are described, a power supply system, which is a system designed by using the design support device 10, will be described.

Figure 2:
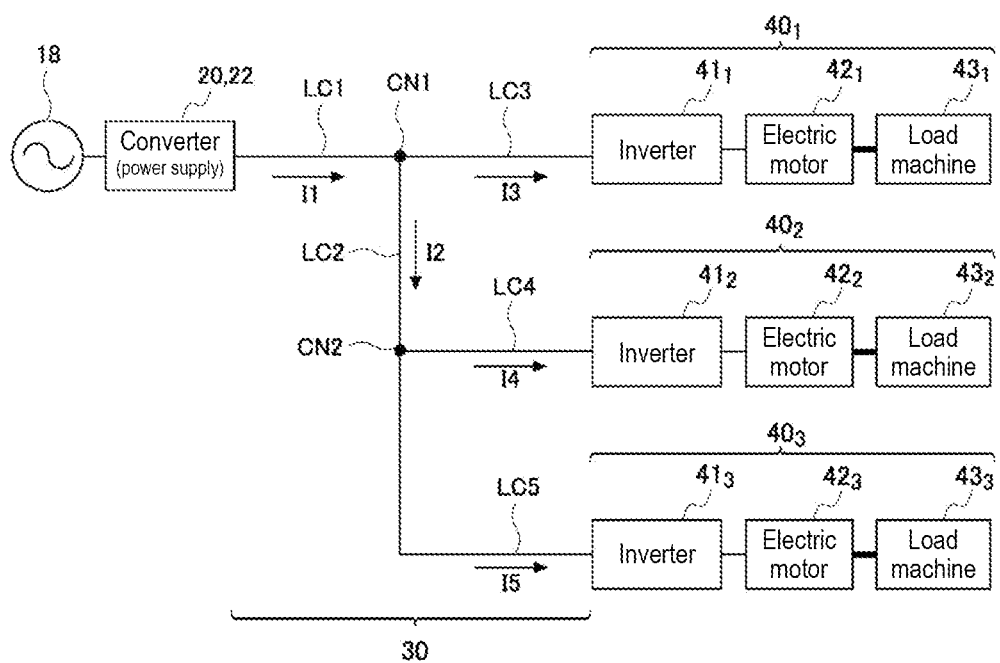
FIG. 2 is an explanatory diagram of a configuration example of a power supply system designed by using the design support device.

The design support device 10 according to the embodiment is a device developed to support the design of the power supply system having the configuration as illustrated in FIG. 2.

That is, the power supply system designed by using the design support device 10 is a system in which power from a power supply 20 is distributed and supplied to a plurality of (three in the figure) load devices 40 by a power distribution supply path 30 in which a plurality of link cables LC are combined. In addition, the power supply system is a system which includes a converter 22 (in other words, a DC power supply) that converts power from a system 18 into a direct current as the power supply 20, and includes a load machine $43_X$, an electric motor $42_X$ that drives the load machine $43_X$, and an inverter $41_X$ that controls the electric motor $42_X$ as load devices $40_X$ (X=1, 2, 3).

The power distribution supply path 30 illustrated in FIG. 2 includes a link cable LC1 for connecting the power supply 20 and a connector CN1, a link cable LC2 for connecting the connector CN1 and a connector CN2, a link cable LC3 for connecting the connector CN1 and the load device $40_1$, and link cables LC4 and LC5 for connecting the connector CN2 and the load devices $40_2$ and $40_3$, respectively. That is, this power distribution supply path 30 has a configuration in which a current I1 flowing through the link cable LC1 is the sum of currents I3 to I5 to the load devices $40_1$ to $40_3$, and a current I2 flowing through the link cable LC2 is the sum of the currents I4 and I5 to the load devices $40_2$ and $40_3$. It is only necessary in the power distribution supply path 30 of the power supply system that the current is distributed to each load device 40 from the link cable LC1 directly connected to the power supply 20 as in the power distribution supply path 30 of FIG. 2.

Figure 3A:
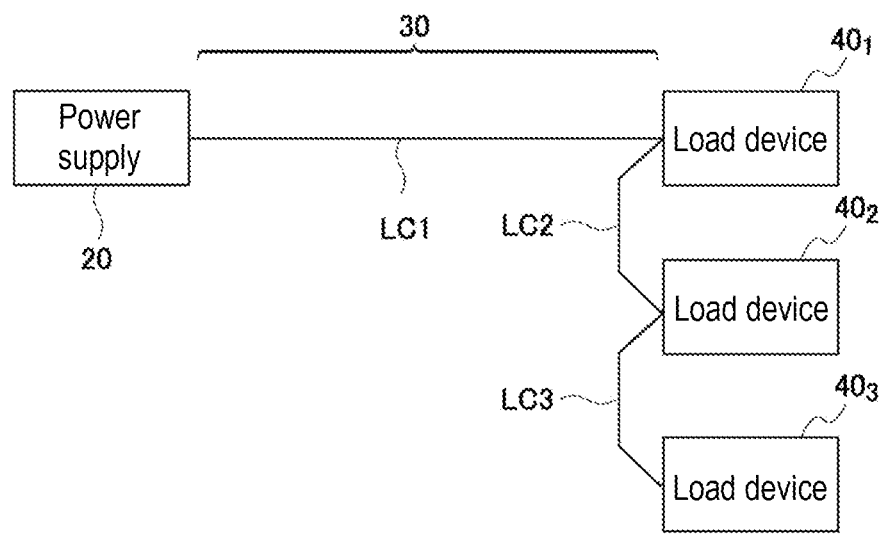
FIG. 3A is an explanatory diagram of a configuration example of a power distribution supply path in the power supply system.
Figure 3B:
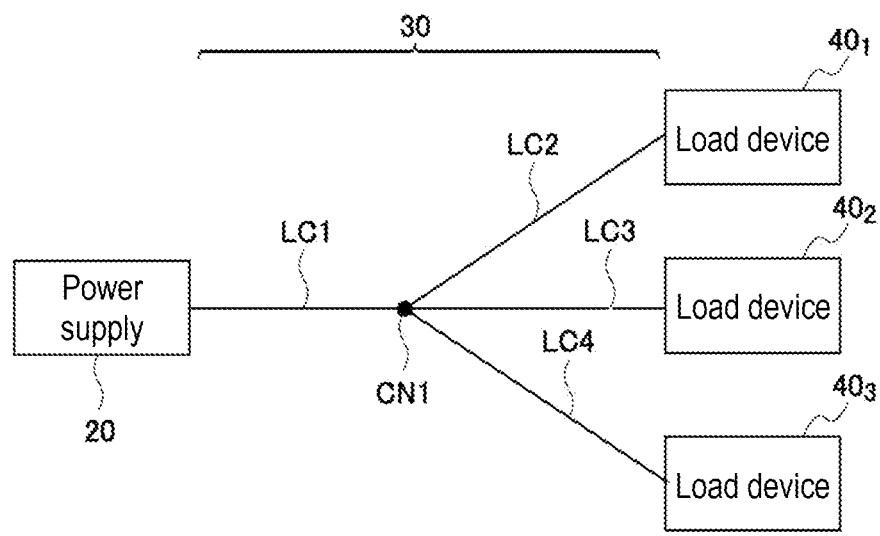
FIG. 3B is an explanatory diagram of a configuration example of the power distribution supply path in the power supply system.
Figure 3C:
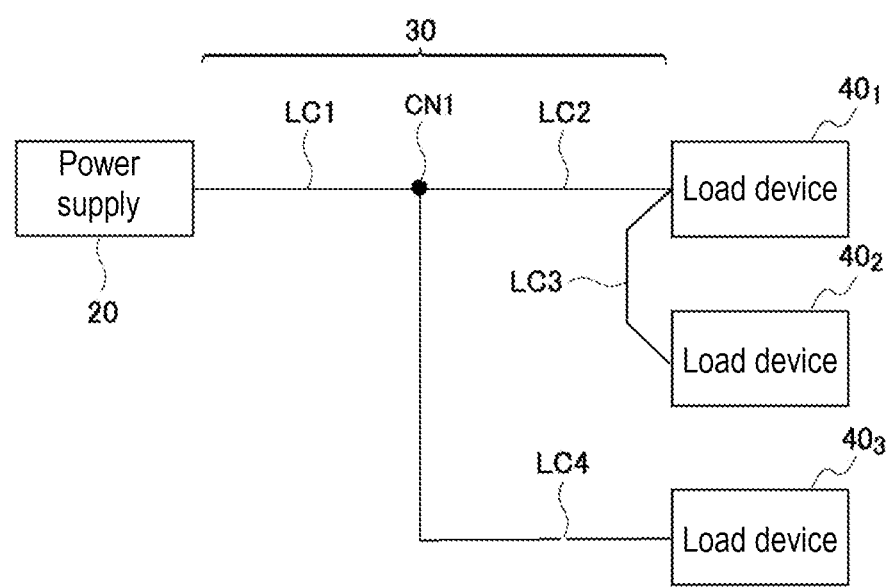
FIG. 3C is an explanatory diagram of a configuration example of the power distribution supply path in the power supply system.

Therefore, as illustrated in FIG. 3A, the power distribution supply path 30 may include a link cable LC1 for connecting the power supply 20 and the load device $40_1$, and the link cables LC2 and LC3 for connecting the load devices $40_1$ to $40_3$ in a daisy chain. Further, as illustrated in FIG. 3B, the power distribution supply path 30 may include the link cable LC1 for connecting the power supply 20 and the connector CN1, and the link cables LC2, LC3, and LC4 for connecting the connector CN1 and the load devices $40_1$, $40_2$, and $40_3$, respectively. Further, as illustrated in FIG. 3C, the power distribution supply path 30 may include the link cable LC1 for connecting the power supply 20 and the connector CN1, the link cables LC2 and LC4 for connecting the connector CN1 and the load devices $40_1$ and $40_3$, respectively, and the link cable LC3 for connecting the load device $40_1$ and the load device $40_2$. The power supply system designed by using the design support device 10 may be a power supply system for 20 minutes per power supply in a system (see FIG. 9) in which power is distributed and supplied from each of a plurality of power supplies 20 to a plurality of load devices 40.

Based on the above, the functions of the design support device 10 (UI processing unit 14 and design support processing unit 15) according to the embodiment will be described below. In the following description, the power supply system to be designed is referred to as a design target system, and the total number of load devices 40 in the design target system is referred to as N (≥2).

The UI processing unit 14 (FIG. 1) is a unit that acquires one or a plurality pieces of configuration information and operation pattern information and specification information for each load device $40_X$ (1≤X≤N) from a user through an operation on the input device 11 while displaying various pieces of image information on a screen of the display 12.

The configuration information acquired from the user by the UI processing unit 14 is information indicating the configuration of the power distribution supply path 30 (see FIGS. 2 and 3A to 3C) of the design target system.

The operation pattern information of the load device $40_X$ (1≤X≤N) acquired from the user by the UI processing unit 14 is a command value group (position command, speed command, etc.) input in time series to the inverter $41_X$ of the load device $40_X$ during the actual operation of the design target system. The specification information of the load device $40_X$ acquired from the user by the UI processing unit 14 is information that can be used to generate data representing a time change pattern of a current flowing into the load device $40_X$ in combination with the operation pattern information of the load device $40_X$ (hereinafter referred to as time series current data). The UI processing unit 14 of the design support device 10 according to the embodiment is configured (programmed) to acquire inertia and a torque constant of the electric motor $42_X$, inertia of the load machine $43_X$, etc. from the user as the specification information of the load device $40_X$. Further, the UI processing unit 14 is also configured to instruct the design support processing unit 15 to execute design support processing when the user inputs an execution instruction of the design support processing after the acquisition of the above information is completed.

Figure 4:
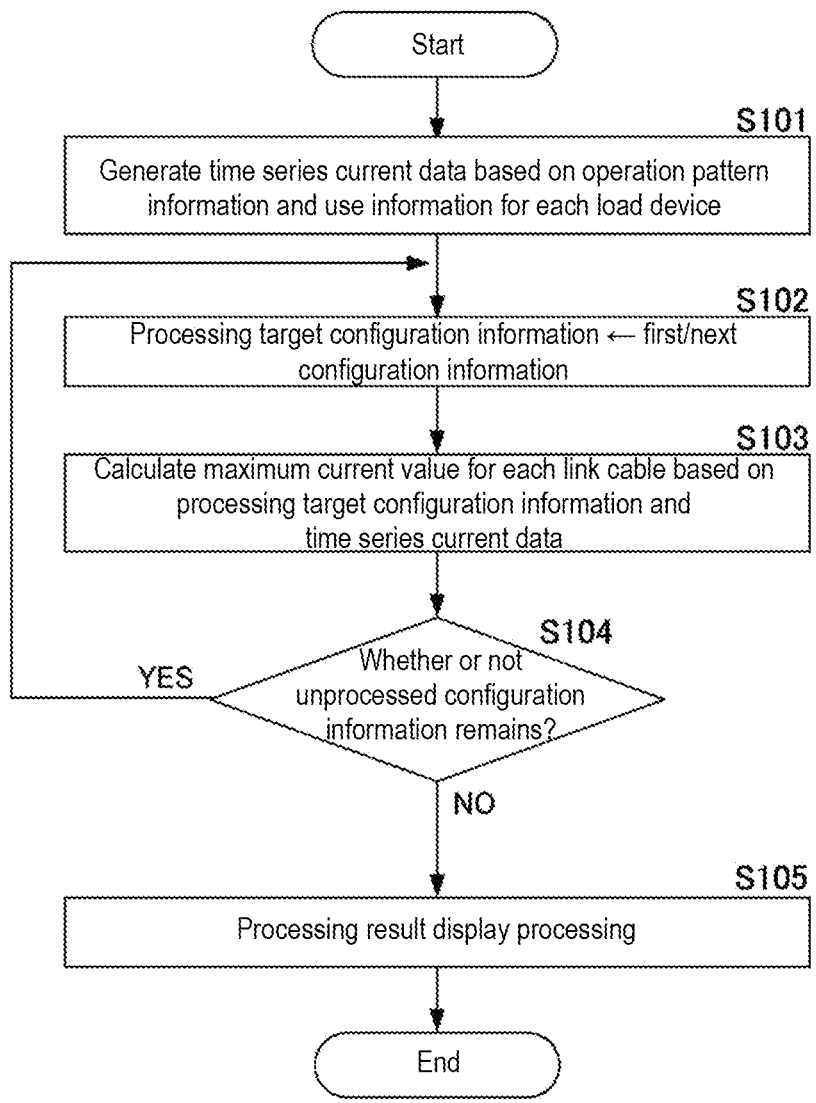
FIG. 4 is a flow chart of design support processing.

FIG. 4 illustrates a flow chart of the design setting support processing executed by the design support processing unit 15.

Figure 5:
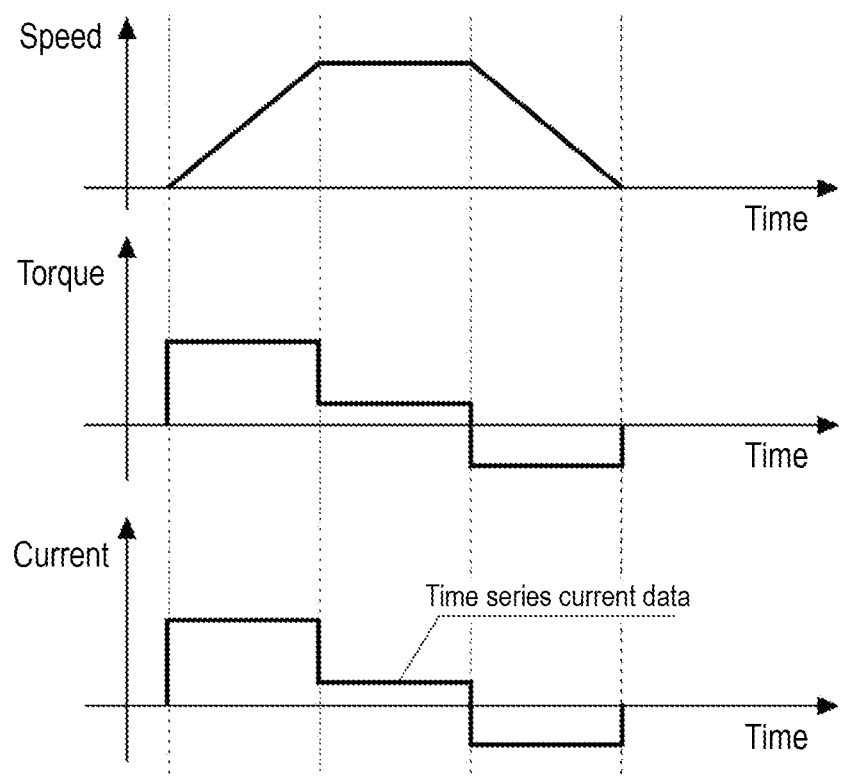
FIG. 5 is an explanatory diagram of a procedure for generating time series current data.

As illustrated in the figure, the design support processing unit 15 that has started the design support processing first generates time series current data of each load device $40_X$ (1≤X≤N) based on the operation pattern information and the specification information regarding each load device $40_X$ (step S101). In this step S101, the design support processing unit 15 obtains a time change pattern of torque of the electric motor $42_X$ based on a time change pattern of speed indicated by the operation pattern information of the load device $40_X$ and the specification information of the load device $40_X$, as schematically illustrated in FIG. 5. Then, the design support processing unit 15 generates the time series current data of the load device $40_X$ by dividing the obtained time change pattern by the set torque constant of the electric motor $42_X$.

The design support processing unit 15 that has completed the processing of step S101 (FIG. 4) stores that processing target configuration information is first configuration information (step S102). Here, when only one configuration information is set by the user, the first configuration information is the configuration information, and, when a plurality of pieces of configuration information are set by the user, the first configuration information is configuration information initially set by the user.

The design support processing unit 15 that has completed the processing of step S102 calculates the maximum value of the current flowing through the link cable LC (hereinafter referred to as the maximum current value) for each cable LC in the power distribution supply path 30 having the configuration indicated by the processing target configuration information based on the processing target configuration information and the generated time series current data group (step S103).

Specifically, in this step S103, the design support processing unit 15 first specifies one or a plurality of load devices 40 to which a current is supplied via the link cable LC for each link cable LC based on the processing target configuration information. Then, for each link cable LC that supplies the current to only one load device 40, the design support processing unit 15 calculates the maximum value of the current in the time series current data for the load device 40 as the maximum current value. Further, for each link cable LC that supplies the current to the plurality of load devices 40, the design support processing unit 15 obtains the time series data of the current flowing through each link cable LC by adding the current value at each time in the time series current data for these load devices 40, and calculates the maximum value of the current in the obtained time series data as the maximum current value.

Further, in step S103, the design support processing unit 15 also performs processing for calculating the maximum value of the current flowing in the direction of the power supply 20 through the link cable LC1 directly connected to the power supply 20 (in other words, the minimum value of the negative current in the time series current data for the link cable LC1) as the maximum regenerative current value.

The design support processing unit 15 that has completed the processing of step S103 determines whether or not unprocessed configuration information (configuration information that has not yet been handled as the processing target configuration information) remains (step S104).

When the unprocessed configuration information remains (step S104; YES), the design support processing unit 15 returns to step S102 and starts processing for the next configuration information. Further, when the unprocessed configuration information does not remain (step S104; NO), the design support processing unit 15 performs processing result display processing (step S105).

The processing result display processing is processing performed by using cable/connector information. Here, the cable/connector information is information that stores the cable diameter of the cable and the name of the connector (identification information of the connector such as the model) to be used in the place where the current of the magnitude within the current value classification flows for various current value classifications, and is stored in the non-volatile storage device of the main body 13 in advance.

Specifically, at the time of processing result display processing, the design support processing unit 15 first reads the cable diameter associated with the maximum current value for each link cable LC calculated in the processing of step S103 based on the cable/connector information for each configuration information set by the user. Further, when the configuration information indicates that some connector CNs are used, the design support processing unit 15 also reads the name of the connector associated with the maximum current value for the cable LC on the power supply 20 side connected to each connector CN based on the cable/connector information.

After that, the design support processing unit 15 displays, for each configuration information, information read from the cable/connector information for each link cable LC, the maximum current value calculated for each link cable LC, and the maximum regenerative current value on the screen of the display 12. Then, the design support processing unit 15 ends the processing result display processing and the design support processing (processing of FIG. 4) of step S105.

The design support device 10 (UI processing unit 14 and design support processing unit 15) according to the embodiment has the above functions. Therefore, according to the design support device 10, the power distribution supply path 30 of the design target system can be configured by the link cables LC having appropriate specifications.

Figure 6:
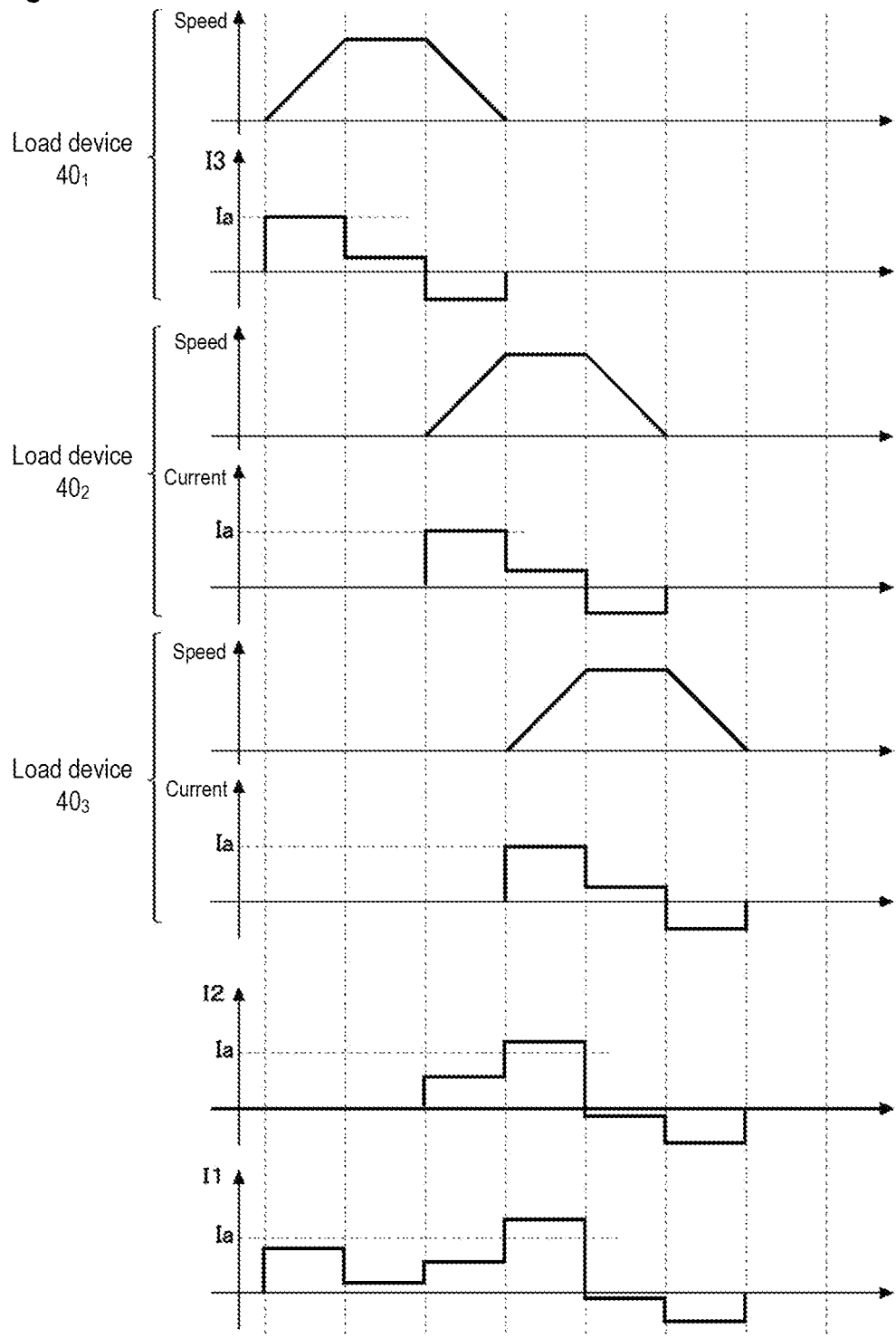
FIG. 6 is a timing chart for explaining the relationship between currents flowing through each load device and two link cables in the power supply system of FIG. 2.

Specifically, a case is assumed in which the design target system is a system having the configuration illustrated in FIG. 2, and the operation pattern information and the specification information regarding the load devices $40_1$ to $40_3$ are information in which the current flowing in the load devices $40_1$ to $40_3$ changes with time as illustrated in FIG. 6.

In this case, in step S103 of the design support processing, first, the following load devices 40 are specified as current supply destination devices by each link cable LC.

Link cable LC1: Load devices $40_1$, $40_2$, and $40_3$
Link cable LC2: Load devices $40_2$ and $40_3$
Link cable LC3: Load device $40_1$
Link cable LC4: Load device $40_2$
Link cable LC5: Load device $40_3$ After that, in step S103, for the link cables LC3 to LC5 that supply a current to only one load device 40, the maximum values of the time series current data of the load devices $40_1$ to $40_3$ (Ia in FIG. 6) are calculated as the maximum current values, respectively.

Further, for the link cable LC2 that supplies a current to the two load devices $40_2$ and $40_3$, the time series data is generated by adding the time series current data of the load devices $40_2$ and $40_3$. Then, the maximum value of the current in the time series data is calculated as the maximum current value for the link cable LC2, but as illustrated in FIG. 6, the times for the current flowing through the load devices $40_2$ and $40_3$ to take the maximum value are different. Therefore, as is clear from the time change pattern of I2 (current flowing through LC2) illustrated in FIG. 6, the maximum current value for the link cable LC2 is a value smaller than 2×Ia, which is the sum of the maximum values of the time series current data of the load devices $40_2$ and $40_3$.

Similarly, the maximum current value for the link cable LC1 that supplies a current to the three load devices $40_1$ to $40_3$ (see the time change pattern of I1 (current flowing through LC1) in FIG. 6) is also a value smaller than 3×Ia, which is the sum of the maximum values of the time series current data of the load devices $40_1$ to $40_3$.

Then, in step S105 of the design support processing, the maximum current value of each link cable LC and the cable diameter of the cable recommended for use as each link cable LC are displayed on the screen of the display 12. As is clear from the above procedure, at this time, the maximum current value displayed for each link cable LC on the screen of the display 12 is smaller than the maximum value of the current flowing through each link cable LC obtained in the conventional procedure. Therefore, the user of the design support device 10 can configure the power distribution supply path 30 from the link cables LC having appropriate specifications based on the information displayed on the screen of the display 12.

In addition, as the power distribution supply path 30 of the design target system, several different configurations may be adopted, and the design support processing (FIG. 4) is processing that can calculate the maximum current value of each link cable LC for each of the plurality pieces of configuration information. Therefore, according to the design support device 10, the power distribution supply path 30 that does not require the high-specification link cable LC can be selected from power distribution supply paths 30 that may be adopted.

Figure 7:
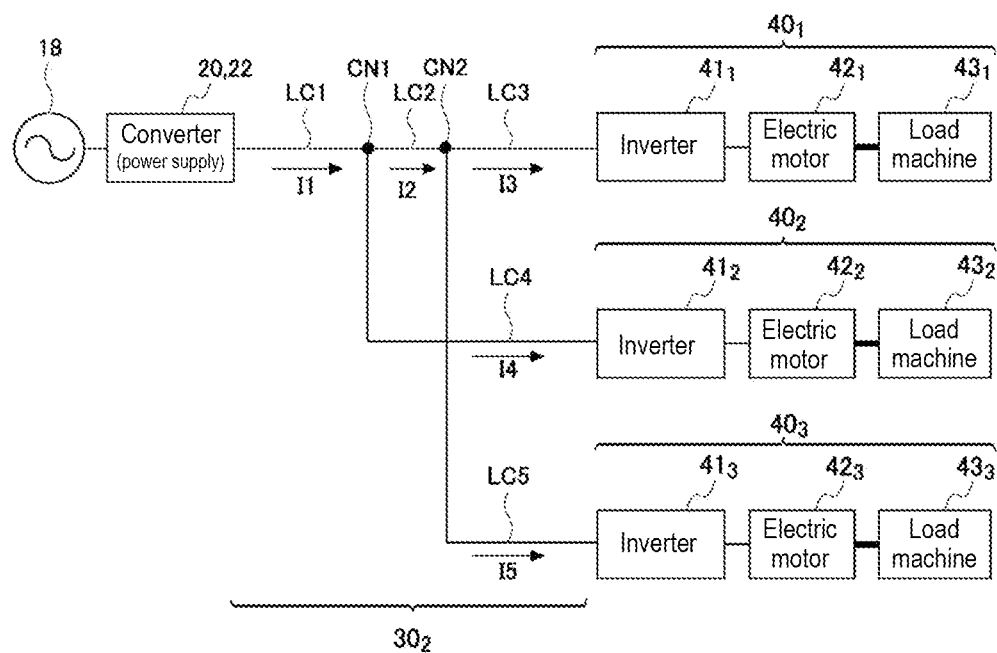
FIG. 7 is an explanatory diagram of a configuration of the power supply system for explaining the content of design support processing.

Specifically, for example, a case is assumed in which the design support processing is executed in the state where the configuration information indicating the configuration of the power distribution supply path 30 illustrated in FIG. 2 and configuration information #2 indicating the configuration of a power distribution supply path $30_2$ illustrated in FIG. 7 are input. The operation pattern information and the specification information regarding the load devices $40_1$ to $40_3$ are information for obtaining the time series current data illustrated in FIG. 6 for the load devices $40_1$ to $40_3$.

Figure 8:
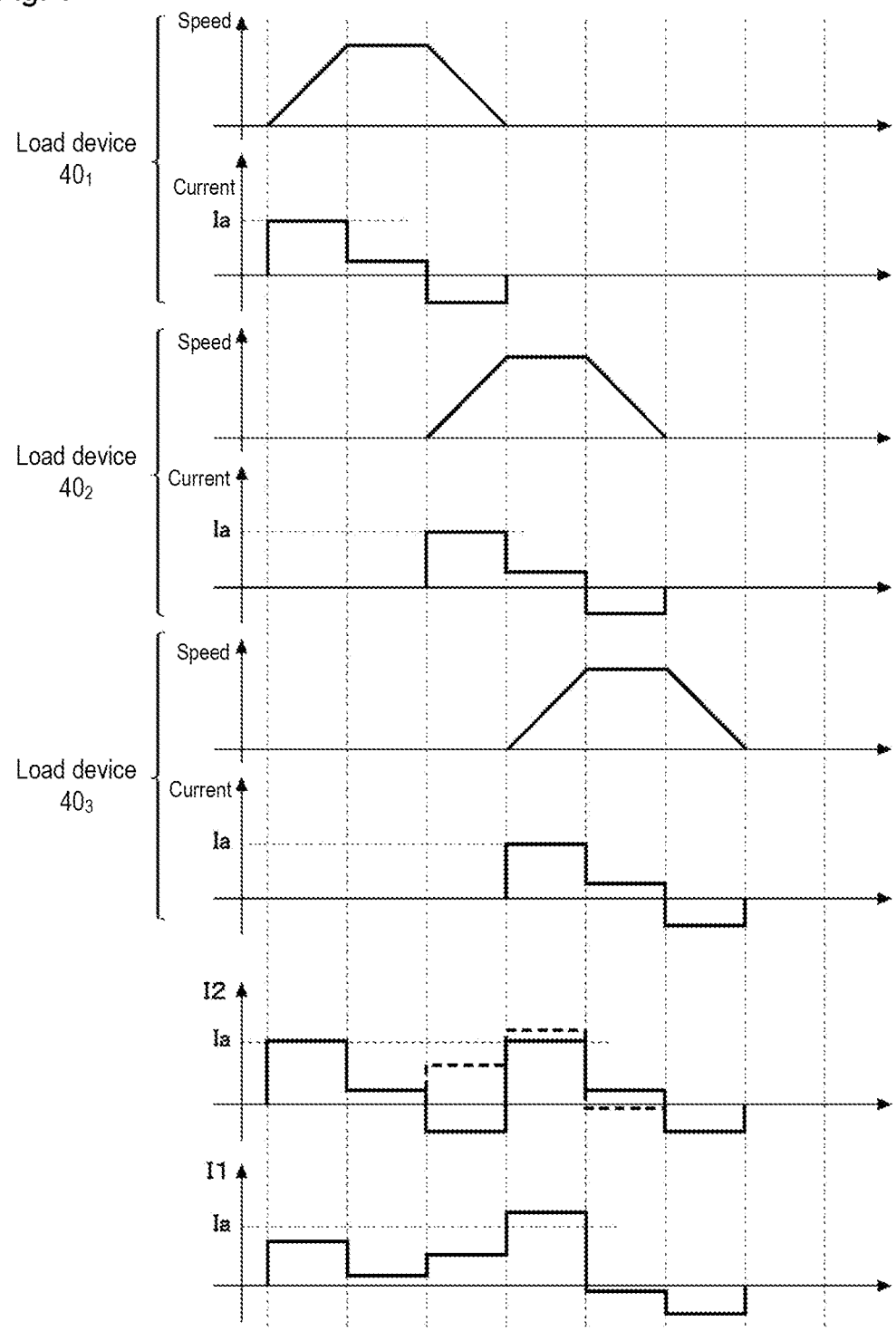
FIG. 8 is a timing chart for explaining the relationship between currents flowing through each load device and two link cables in the power supply system of FIG. 7.

In this case, as illustrated in FIG. 8, the current I1 flowing through the link cable LC1 of the power distribution supply path $30_2$ changes with time in the same pattern as the current I1 (see FIG. 6) flowing through the link cable LC1 of the power distribution supply path 30 of FIG. 2. Further, the currents I3 to I5 flowing through the link cables LC3 to L5 of the power distribution supply path $30_2$ also change with time in the same pattern as the currents I3 to I5 flowing through the link cables LC3 to LC5 of the power distribution supply path 30 of FIG. 2.

However, the current I2 that changes with time flows through the link cable LC2 of the power distribution supply path $30_2$ as indicated by the solid line in FIG. 8. As a result, the maximum value of the current I2 flowing through the link cable LC2 of the power distribution supply path $30_2$ is smaller than the maximum value of the current I2 (dotted line in FIG. 8) flowing through the link cable LC2 of the power distribution supply path 30 of FIG. 2. Then, in step S105 of the design support processing, the maximum current value of each link cable LC and the like are displayed on the screen of the display 12 for each configuration information, so that the user of the design support device 10 can select the power distribution supply path 30 that does not require the high-specification link cable LC from the power distribution supply paths 30 that may be adopted based on the information displayed on the screen of the display 12.

Further, the design support processing unit 15 also has a function of displaying the maximum regenerative current value (the maximum value of the current flowing through the link cable LC1 directly connected to the power supply 20 in the direction of the power supply 20) on the screen of the display 12. Therefore, the user of the design support device 10 can appropriately determine the specifications of a smoothing capacitor and a regenerative resistor provided in the link cable LC1 and the like based on the maximum regenerative current value.

<<Modified Form>>

The design support device 10 according to the above-described embodiment can be modified in various ways. For example, the design support device 10 may be modified into a device in which each load device 40 includes a servo driver instead of the inverter 41, and the power supply 20 supports the design of the power supply system which is a DC power supply. The power supply 20 of the power supply system may be such that outputs of a plurality of power supplies (for example, an AC/DC converter and a battery) are connected in parallel.

The design support device 10 may be modified into a device for supporting the design of the power supply system including the load device 40 unrelated to the servo control as each load device 40. When the design support device 10 is modified into such a device, it is only necessary that the operation pattern information be information which represents the operation pattern of the load device 40 and can be converted into a time change pattern of a current flowing in the load device 40 alone or in combination with other information. When the design target system (the power supply system whose design is supported by the design support device 10) is a system including a link cable LC in which a regenerative current having a magnitude exceeding the maximum value of a power running current may flow, the processing of step S103 should be processing for calculating the maximum value of the regenerative current flowing through the link cable LC (the minimum value of the negative current in the time series current data for the link cable LC) for the link cable LC.

The processing result display processing (S105 of FIG. 4) may be modified into processing different in the specific content from the above-mentioned processing, for example, processing for displaying only the maximum current value, processing for displaying only the cable diameter, and processing for displaying information other than the cable diameter (such as the product name of the cable).

Figure 9:
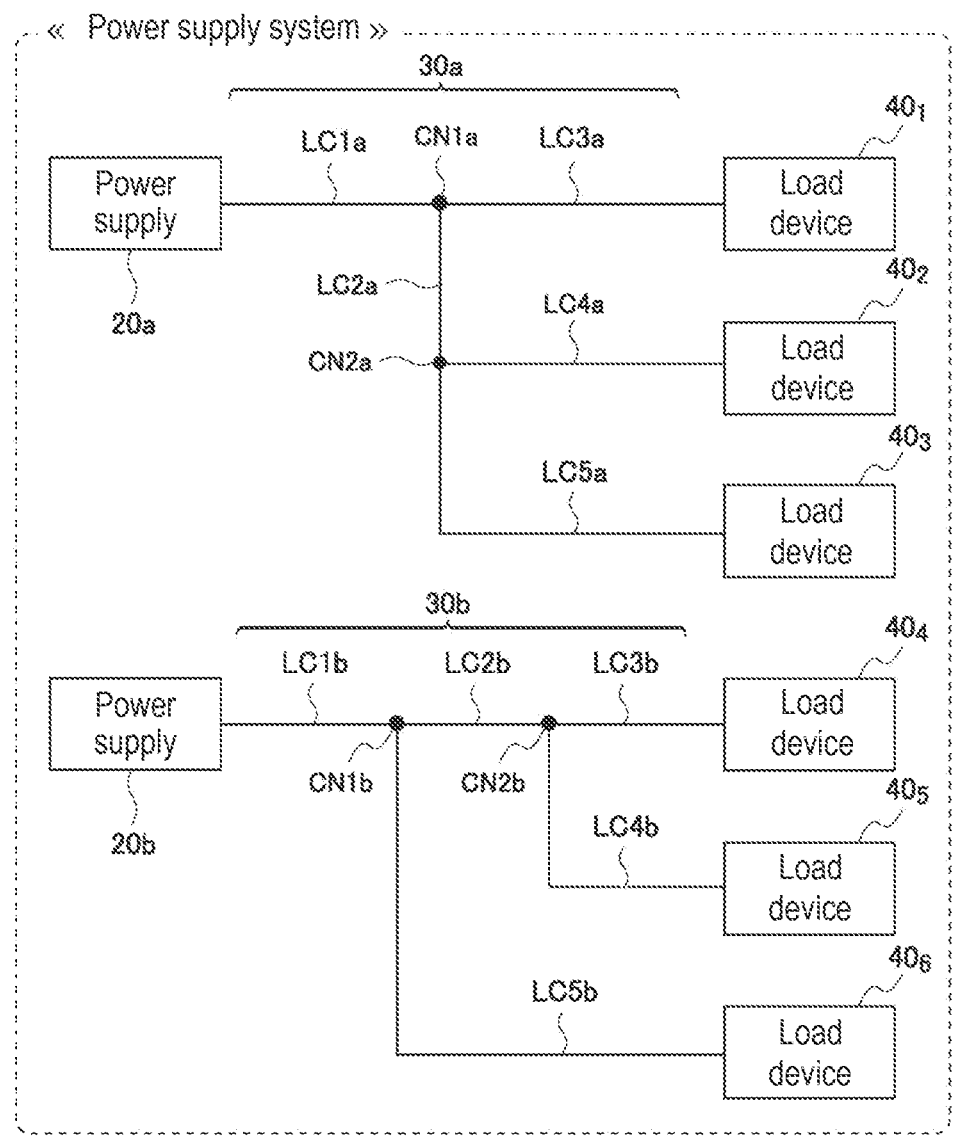
FIG. 9 is a diagram for explaining a modified example of the design support processing.

The design support device 10 may be modified into a device that can support design of a power supply system having the configuration illustrated in FIG. 9, that is, a power supply system in which power is distributed and supplied to a plurality of load devices 40 from each of a plurality of power supplies 20 (20a and 20b in the figure). When the design support device 10 is modified into such a device, if it is found by analysis of the configuration information indicating the configuration of the power distribution supply path 30 that a plurality of power supplies 20 are included, it is only necessary that the configuration information and the operation pattern information be divided into information for each power supply 20, and the above-mentioned design support processing be performed for each divided information. The information for each power supply 20 is, when the power supply system has the configuration illustrated in FIG. 9, configuration information indicating the configuration of a power distribution supply path 30a and operation pattern information for the load devices $40_1$ to $40_3$ for the power supply 20a, and configuration information indicating the configuration of a power distribution supply path 30b and operation pattern information for load devices $40_4$ to $40_6$ for the power supply 20b.

As a matter of course, some functions may be removed from the above-mentioned design support device 10, and the design support device 10 may be modified into a device that inputs/outputs information via a network (in other words, a device that does not include the input device 11 and the display 12).

<<Supplementary Note 1>>

A design support device (10) configured to support design of a power supply system in which power from a power supply (20) is distributed and supplied to a plurality of load devices (40) by a power distribution supply path (30) in which a plurality of power cables are combined, the design support device (10) including:

a first acquisition unit (14) configured to acquire configuration information indicating a configuration of the power distribution supply path (30);

a second acquisition unit (14) configured to acquire, for each of the plurality of load devices, operation pattern information which represents an operation pattern of the load device and can be converted into a time change pattern of a current flowing in the load device;

a calculation unit (15) configured to calculate, for each power cable in the power supply system, a maximum current value, which is a maximum value of a current flowing through the power cable, based on the configuration information acquired by the first acquisition unit (14) and the operation pattern information for the plurality of load devices acquired by the second acquisition unit (14); and an output unit (15) configured to output, for each power cable in the power supply system, at least one of the maximum current value for the power cable and cable specification information, which specifies a cable recommended for use as the power cable, based on the maximum current value for each power cable calculated by the calculation unit (15).

DESCRIPTION OF SYMBOLS 10 design support device
11 input device
12 display
13 main body
14 UI processing unit
15 design support processing unit
16 design support program
17 non-volatile storage
18 system
20 power supply
22 converter
30 power distribution supply path
40 load device
41 inverter
42 electric motor
43 load machine

The invention claimed is:

1. A design support device configured to support design of a power supply system in which power from a power supply is distributed and supplied to a plurality of load devices by a power distribution supply path in which a plurality of power cables are combined, the design support device comprising:
   a first acquisition unit configured to acquire configuration information indicating a configuration of the power distribution supply path;
   a second acquisition unit configured to acquire, for each of the plurality of load devices, operation pattern information representing an operation pattern of the load device;
   a calculation unit configured to calculate, for each power cable of the plurality of power cables in the power supply system, a maximum current value, which is a maximum value of a current flowing through the power cable, based on the configuration information acquired by the first acquisition unit and the operation pattern information for the plurality of load devices acquired by the second acquisition unit; and
   an output unit configured to output, for each power cable of the plurality of power cables in the power supply system, at least one of the maximum current value for the power cable and recommended cable information representing a cable recommended for use as the power cable based on the maximum current value for each power cable calculated by the calculation unit,
   wherein the calculation unit is configured to:
   generate first time series current data of a current flowing into each load device of the plurality of load devices based on the operation pattern information for each load device,
   calculate, for each power cable of the plurality of power cables in the power feeding system, a second time series current data of the current flowing through the power cable by adding values of currents in the first time series current data for each load device connected to the power cable, and
   determine a maximum value of the current in the second time series current data as the maximum current value for the power cable.

2. The design support device according to claim 1,
   wherein the power supply system is a system which includes a DC power supply as the power supply, and includes a load machine, an electric motor configured to drive the load machine, and an inverter configured to control the electric motor as the plurality of load devices,
   wherein the second acquisition unit is configured to acquire a command value group input in time series to the inverter of each load device as the operation pattern information for each load device during an actual operation of each load device.

3. The design support device according to claim 2,
   wherein the calculation unit is further configured to calculate a maximum value of a regenerative current flowing through the power cable directly connected to the power supply in a direction of the power supply based on the time series data for each load device, and
   wherein the output unit is configured to output also the maximum value of the regenerative current calculated by the calculation unit.

4. The design support device according to claim 1,
   wherein the first acquisition unit is configured to be able to acquire a plurality of pieces of the configuration information, and
   wherein, when the plurality of pieces of the configuration information are acquired by the first acquisition unit, the calculation unit is configured to calculate the maximum current value for each power cable of the plurality of power cables in the power supply system having a configuration defined by the configuration information for each acquired configuration information.

5. The design support device according to claim 1,
   wherein the power distribution supply path includes one or a plurality of cable connection connectors configured to connect at least three power cables in the plurality of power cables, and
   wherein the design support device further includes a second output unit configured to output connector designation information for designating a connector recommended for use as each cable connection connector based on the maximum current value for each power cable calculated by the calculation unit.

6. A non-transitory computer readable medium storing a design support program configured to operate a computer as the design support device according to claim 1.

* * * * *